United States Patent [19]

Breen

[11] Patent Number: 4,752,212
[45] Date of Patent: Jun. 21, 1988

[54] RECUPERATIVE BURNERS

[75] Inventor: Robert J. Breen, Birmingham, England

[73] Assignee: British Gas plc, London, England

[21] Appl. No.: 943,000

[22] Filed: Dec. 18, 1986

[30] Foreign Application Priority Data

Dec. 18, 1985 [GB] United Kingdom ............... 8531157

[51] Int. Cl.$^4$ .................................................. F23D 11/44
[52] U.S. Cl. ...................................................... 431/215
[58] Field of Search ................................. 431/116, 215

[56] References Cited

U.S. PATENT DOCUMENTS

| | | | |
|---|---|---|---|
| 4,210,411 | 7/1980 | Ward et al. ........................... | 431/215 |
| 4,408,983 | 10/1983 | Masters et al. ....................... | 431/116 |
| 4,453,913 | 6/1984 | Gitman ................................... | 431/215 |

Primary Examiner—Carroll B. Dority, Jr.
Attorney, Agent, or Firm—Oblon, Fisher, Spivak, McClelland & Maier

[57] ABSTRACT

A recuperative burner comprises an outer annular two part duct 13 and 14 for supplying combustion air to four axially aligned chambers 15 located radially inwardly of the ducts 13 within the annular space between the duct 14 and a central fuel pipe 23. The combustion air enters the burner by way of an inlet 9 before entering the outermost duct 14. The air then travels along the innermost duct 13 and enters each chamber 15 by way of an inlet 20. The air then flows forwardly along each chamber 15 before leaving the chamber 15 by way of an outlet 21 before mixing with the fuel leaving a nozzle 24 at the outlet end of the fuel pipe. Waste gas flows in the spaces 22 between the chambers 15 in a direction opposite to the direction of air flow in the chambers 15 before leaving the burner 1 by way of an outlet 11. Heat from the waste gas is transferred to the air flowing in each chamber 15 and to the air flowing in the annular duct 14.

8 Claims, 7 Drawing Sheets

RECUPERATIVE BURNERS

FIELD OF THE INVENTION

The present invention relates to recuperative burners.

BACKGROUND OF THE INVENTION

Recuperative burners are used in fuel-fired industrial furnaces, heat treatment furnaces and similar installations of that kind. In use of these types of burner, fuel and combustion air are delivered separately to a point (usually a nozzle at the outlet end of the burner fuel pipe) where the fuel and air mix and are then ignited for combustion within the installation or possibly within a combustion chamber forming part of the burner. The burners are so designed that waste combustion products (waste gas) leaving the installation are caused to leave the installation by way of a passage within the burner so that incoming combustion air flowing to the burner nozzle by way of another passage can be preheated by heat exchange with the outgoing waste gas before the air is mixed with the fuel so as to "recoup" or recover from the waste gas at least a proportion of its waste heat to raise the overall efficiency of the combustion process.

British patent specification Nos. 1331427 and 1332125 describe recuperators typical of those which are currently on the market.

OBJECT OF THE INVENTION

It is an object of the present invention to provide a recuperative burner in which heat recovery is higher than is available with the current types of recuperator.

SUMMARY OF THE INVENTION

According to the present invention, there is provided a recuperative burner comprising a fuel passage having an inlet to receive fuel and terminating at one end in an outlet for the discharge of the fuel, a waste gas passage for receiving waste gas from the enclosure and for discharging the waste gas from the burner, a first combustion air passage for receiving air for combuston of the fuel, the first air passage surrounding at least part of the waste gas passage so that heat transfer can take place between the combustion air and the waste gas, and at least one second combustion air passage connecting the first air passage to the outlet end of the fuel passage so as to permit the air to mix with the fuel before ignition, the second air passage or passages extending through the waste gas passage to permit further heat transfer to take place between the combustion air and the waste gas before the combustion air mixes with the fuel.

BRIEF DESCRIPTION OF THE DRAWINGS

Embodiments of the invention will now be particularly described with reference to the accompanying drawings in which.

DETAILED DESCRIPTION OF THE PRESENTLY PREFERRED EMBODIMENT

Figure 1:
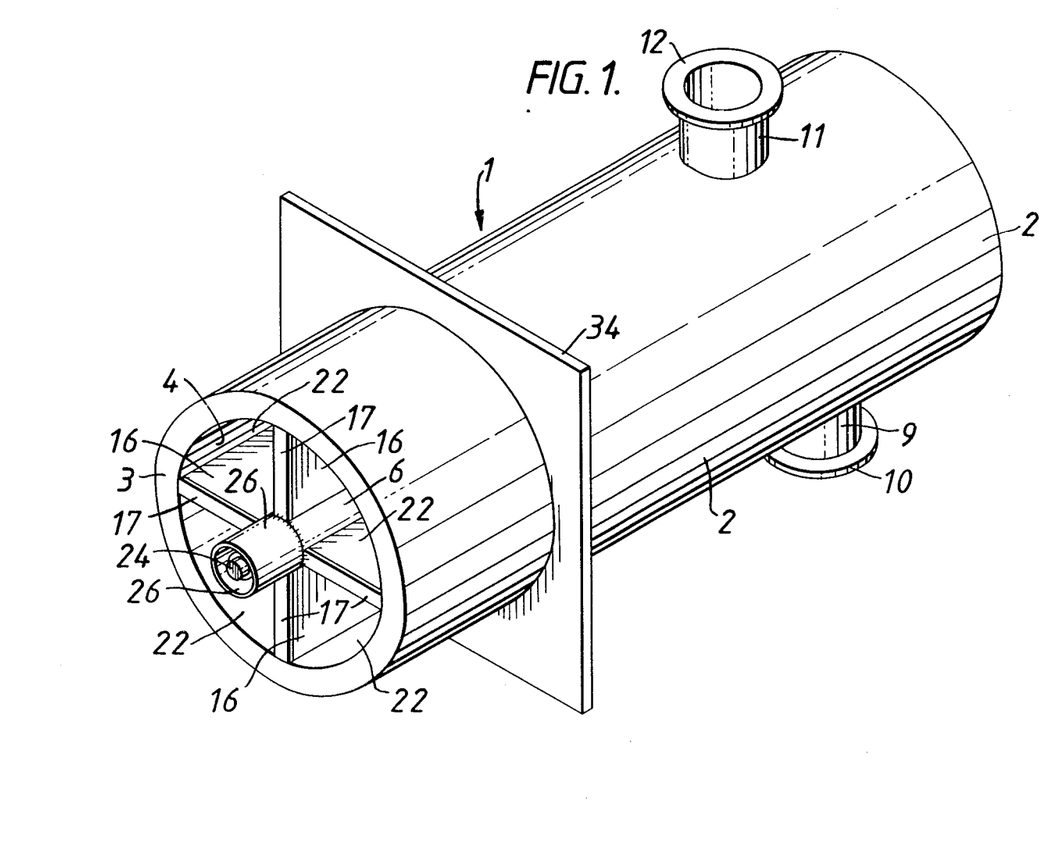
FIG. 1 is a perspective view of one embodiment of the burner from one side of and slightly above the burner.
Figure 2:
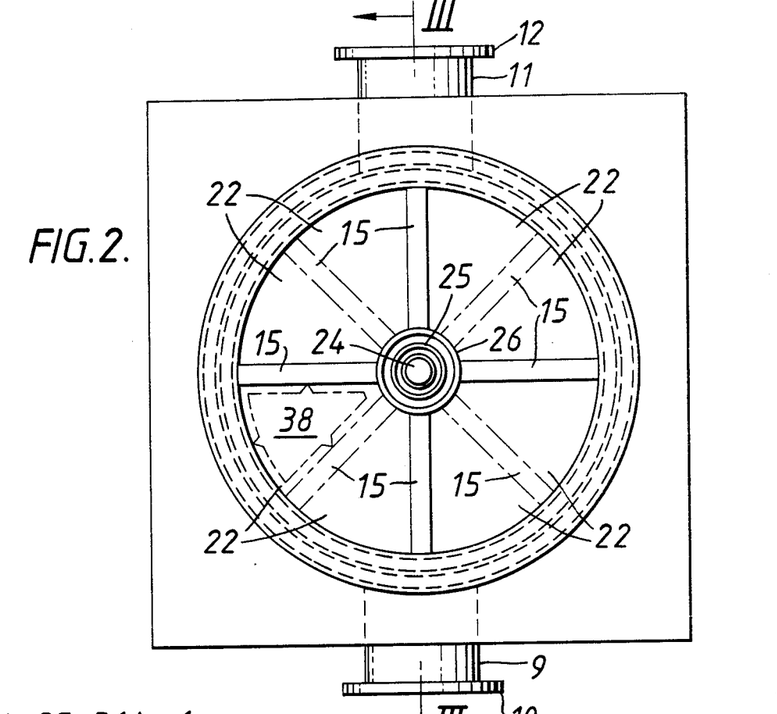
FIG. 2 is a front elevation.
Figure 3:
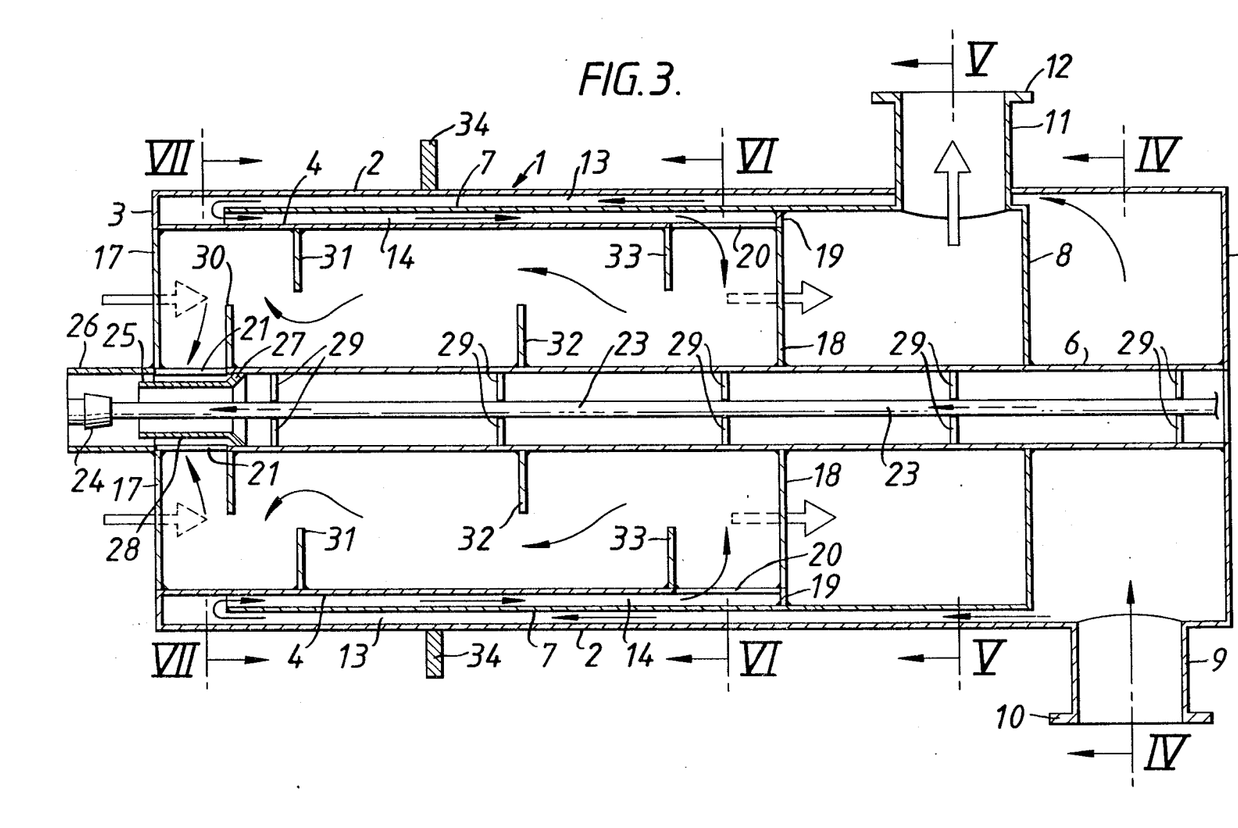
FIG. 3 is a view along the lines III—III, of FIG. 2.
Figure 4:
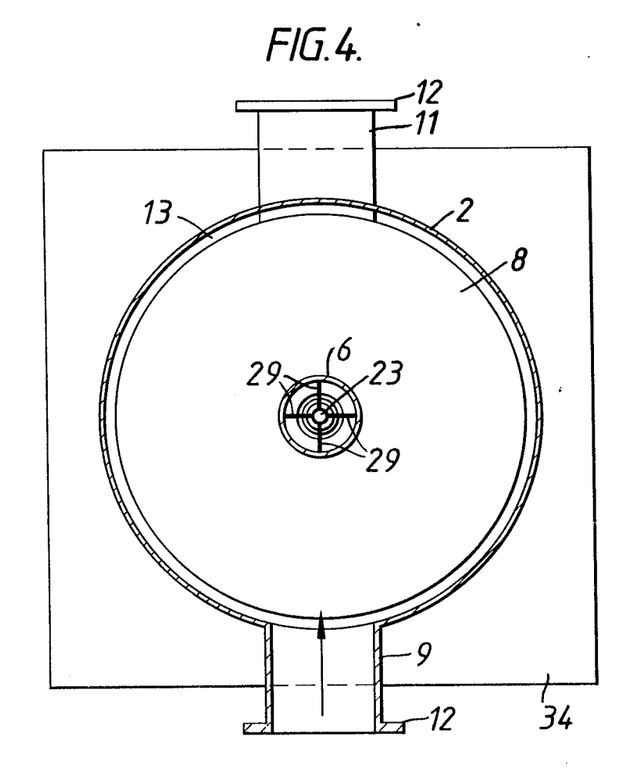
FIG. 4 is a view along the lines IV—IV of FIG. 3.
Figure 5:
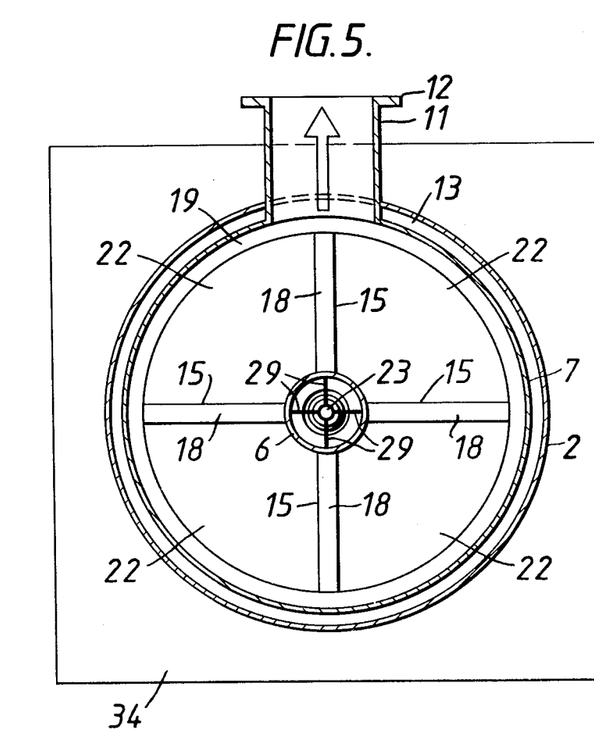
FIG. 5 is a view along the lines V—V of FIG. 3.
Figure 6:
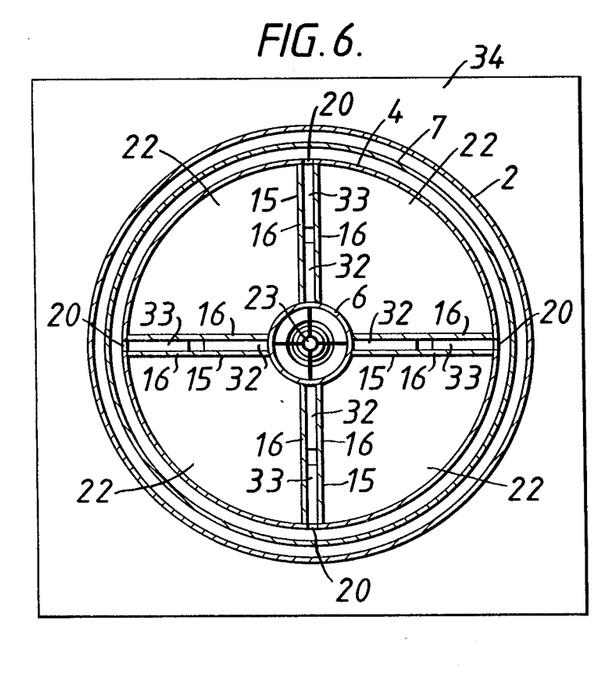
FIG. 6 is a view along the lines VI—VI of FIG. 3.
Figure 7:
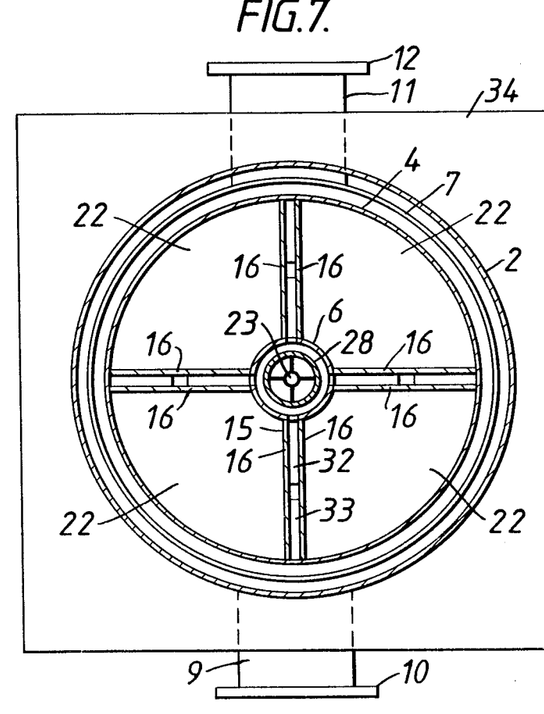
FIG. 7 is a view along the lines VII—VII of FIG. 3.

Referring to the FIGS. 1 to 7, particularly FIG. 3, a burner 1 comprises an outermost tube 2 which at its front end adjoins a radially inwardly directed annular flange 3 from the innermost surface of which there extends rearwardly a further tube 4 terminating beyond the mid-point of the tube 2. The back end of the tube 2 adjoins a further radially inwardly directed annular plate 5 from the innermost surface of which there extends forwardly an innermost tube 6 terminating adjacent to the flange 3.

Positioned between the outermost tube 2 and the tube 4 is another tube 7 which extends from a point spaced from the flange 3 to a point adjacent to the rear plate 5 where the tube 7 adjoins a further radially inwardly directed annular plate 8. The innermost surface of the annular plate 8 adjoins the innermost tube 6.

The outermost tube 2 is formed at a point lying between the plates 5 and 8 with a radially outwardly directed stub pipe 9 forming an inlet for combustion air. The pipe 9 is flanged at 10 for connecting the inlet to a suitable source of compressed air (not shown) for providing the combustion air.

The tube 7 is formed at a point forwardly of but adjacent to the plate 8 with a radially outwardly directed stub pipe 11 which extends through the outermost tube 2 and which forms an outlet for waste gas. The pipe 11 is flanged at 12 for connecting the outlet to a suitable exhaust duct (not shown).

The tubes 2, 7 and 4 form a first combustion air passage comprising two annular ducts 13 and 14. The outermost duct 13 receives the combustion air from the inlet 9, and the air is caused to travel in a forward direction before reversing its direction at the flange 3 for travel in a rearward opposite direction along the innermost duct 14 (see linear arrows).

Located between the innermost tube 6 and the tube 4 are four axially extending second combustion air passages which are in the form of chambers 15 (shown in FIG. 2) and are circumferentially equi-spaced around the innermost tube 6. Each chamber 15 is formed by the tube 4 serving as a radially outermost wall, the tube 6 serving as a radially innermost wall, two spaced apart side walls 16 extending axially of the burner 1 and adjoining the tubes 4 and 6, a depending rectangular plate 17 ajoining the tubes 4 and 6 at the forward end, and a rectangular plate 18 adjoining the walls 16, the tube 6 inwardly and a circular flange 19 directed radially inwardly from the tube 7 at the rearward end to close off the rear end of the chamber 15. As shown in FIG. 3 the front plate 17 lies in the same plane as the flange 3 and terminates radially inwardly level with the forward end of the tube 6.

The wall of the tube 4 is apertured at a rearward point within the chambers 15 so formed short of the plates 18 and the flange 19 so as to form inlets 20 for the chambers 15 to receive air from the annular air duct 14.

The wall of the tube 6 is also apertured at a forward point with the chambers 15 so formed short of the plate 17 so as to form outlets 21 for discharge of air from the chambers 15.

The chambers 15 form with the innermost tube 6, the tube 7 and between the adjacent walls 16 of adjacent chambers 15, four axially extending segment shaped passages or ducts 22 for the passage of waste gas from the front end of the burner 1 towards the plate 8 and thence through the exhaust pipe 11 (as shown by the solid arrows in FIG. 3). In so doing, waste heat from the waste gas is caused to be transferred across the wall of the tube 4 to the combustion air travelling along the innermost annular duct 14. In addition, waste heat from the waste gas is also transferred across the side walls 16 to the combustion air in the chambers 15 leading overall to enhanced heat recovery.

Extending through the innermost tube 6 is a conventional fuel delivery pipe 23 through which, in use, fuel is conveyed (in the direction of the arrows) to an outlet end formed by a conventional mixing nozzle 24 at the forward end of the pipe 23. The rearward end (not shown) of the pipe 23 terminates at a point rearwardly of the plate 5 where the pipe 23 is connected to a fuel source. This may be a natural gas supply.

The pipe 23 extends through an annular air deflector ring 25 with the nozzle 24 terminating within an annular fuel/air mixing ring 26.

The deflector ring 25 has a rearward portion 27 secured to the inner wall of the tube 6 at a point just rearward of the chamber air outlets 21 and a forward portion 28 leading from the rearward portion 27. The rearward portion 27 tapers radially inwardly in a forward direction to adjoin the forward portion 28, which is tubular in shape and is of slightly smaller diameter than the tube 6.

The mixing ring 26 projects forwardly form the plate 17 to which the ring 26 is attached. The mixing ring 26 is concentric with and has a diameter similar to the tube 6.

In use, air leaving the chamber outlets 21 is caused to flow into the mixing ring 26 by the deflector ring 25. The air meets fuel leaving the nozzle 24 within the ring 26 and mixes with the fuel to form a combustible mixture. A conventional spark or pilot flame ignition device (not shown) is provided to ignite the fuel/air mixture. A flame probe may be provided to check for the presence of a flame, as is conventional.

The fuel delivery pipe 23 is mounted within the tube 6 by means of five sets of radial pins 29, the sets being spaced apart along the length of the pipe 23. There are four pins 29 within each set circumferentially equi-spaced around the pipe, 23 and each pin 29 is secured to the outer wall of the pipe 23 to enable the pipe 23 to slide along the tube 6 to a required position.

Each chamber 15 is provided with annular baffle plates 30 to 33 serving as baffles for the flow of combustion air through the chamber. The baffle plates are arranged in pairs, one pair 30 and 32 extending radially outwardly from the inner wall of the tube 6 and terminating short of the wall of the tube 4, and the other pair 31 and 33 extending radially inwardly from the wall of tube 4 and terminating short of the wall of tube 6. As shown in FIG. 3 each plate 30 joins the rearward end of each air outlet 21, while each plate 33 adjoins the forward end of each air inlet 20, with the plate 31 being located between the plates 30 and 32 and the plate 32 being located between the plates 31 and 33.

In use, air entering each chamber inlet 20 is caused to flow generally forwardly in the direction of the linear arrows towards the chamber outlet 21. The baffle plates serve to cause the air flow path to undulate to enhance heat transfer between the air and the waste gas.

Figure 8:
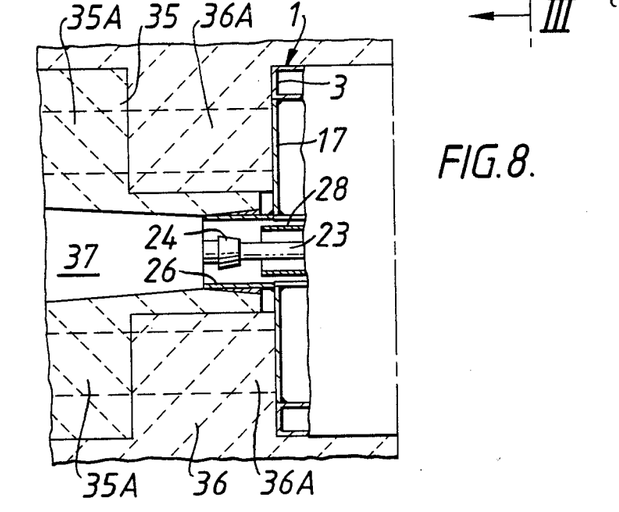
FIG. 8 is a cross-section view of the front of the burner shown in position with the wall of the furnace.

The burner 1 is provided with an external square flange 34 circumventing the outermost tube 2 to permit the burner to be affixed to the wall of a furnace or the like installation as shown in FIG. 8. The fuel/air mixing ring 26 may be located in a refractory block 35 forming part of a furnace wall 36 and providing a combustion chamber 37 for combuston of the fuel/air mixture. The refractory block 35 and the furnace wall 36 are provided with aligned products passages 35A and 36A shown in outline in FIG. 8 to supply waste gas to the waste gas ducts 22 in the burner 1.

Referring to FIG. 2, there may be further chambers 15 (shown in broken line); in this case there are eight chambers altogether, circumferentially equi-spaced around the innermost tube 6 and axially extending through the centre of the waste gas duct to form eight segmental waste gas duct spaces 22. To stimulate the flow of waste combustion products against the side walls 16 of the chambers 15 and against the tube 4, there may be located within each space an insert 38 (shown in broken line) of for instance ceramic fibre. Each insert causes the waste gas to be channeled against the side walls 16 of adjacent chambers 15 and against the wall of the tube 4. This further enhances the heat recovery process.

The burner may incorporate any convenient number of the chambers described depending on the available space within the waste gas duct (the passage formed between the innermost tube 6 and the tube 4).

The external axial walls 16 of the chambers 15 may be provided with means (e.g., fins), for further improving heat transfer between the waste gas and the combustion air.

Figure 9:
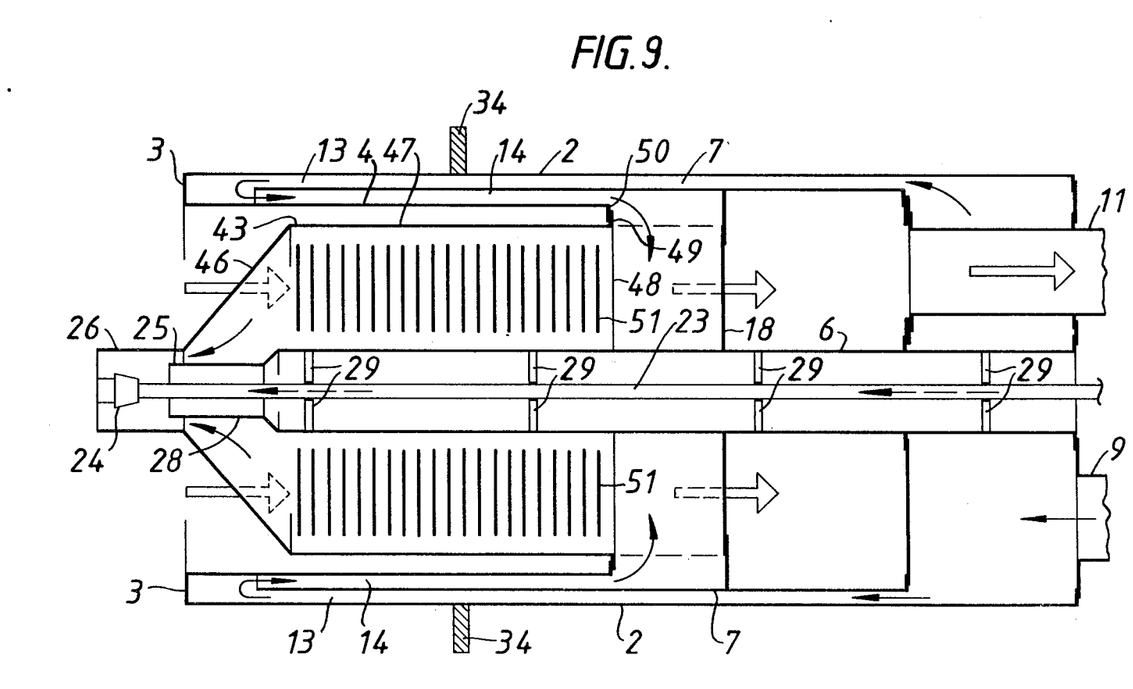
FIG. 9 is a cross-section of a further embodiment of the burner.
Figure 10:
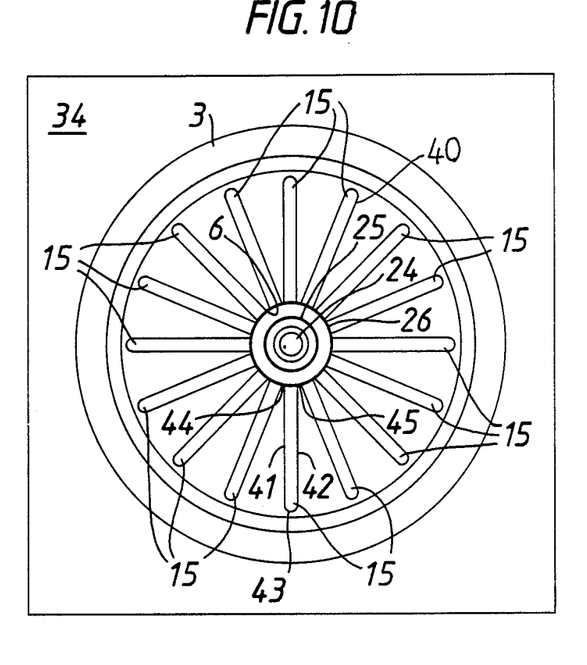
FIG. 10 is a front elevaton of this further embodiment.

Referring to FIGS. 9 and 10 where parts similar in shape or function to those shown in FIGS. 1 to 7 bear the same reference numerals, instead of there being merely four axially extending second combustion air passages as in the burner shown in FIGS. 1 to 7, there are now sixteen such passages in the form of chambers 15 which are circumferentially equi-spaced around the innermost tube 6. In this case each chamber is formed by a plate 40 folded into a U - section so that the plate 40 has two side walls 41, 42, and outermost circular wall 43, and two radially innermost free edges 44, 45 which in use are welded to the tube 6. The wall 43 has a front end 46 which slopes radially inwardly to adjoin the circular mixing ring 26.

Otherwise the wall 43 has a generally horizontal rear part 47 extending parallel to the tube 4. The rear end 48 of the chamber 15 is open to receive air from the annular duct 14. A flange 49 extends radially outwardly from the wall 43 at the rear end 48 and is secured to a radially inwardly directed flange 50 on the tube wall 4. As an alternative to the folded plate, the chambers 15 may be made from a flattened tube.

The chambers 15 may contain baffles similar to 31, 32, 33 described with reference to FIG. 3.

Alternatively, instead of baffles there may be ribs or fins 51 (see FIG. 8) formed on the internal surface of the chamber walls 41, 42. Alternatively, the chambers may contain simple wire mesh.

We have found that, not only are the burners described capable of increasing the extent of heat recovery from waste gas in comparison to a conventional recuperator, but that the burners described can also be manufactured at lower cost.

What is claimed:

1. A recuperative burner comprising:
   (a) a first tube for receiving fuel at one end and then discharging it at the other end;
   (b) a second tube surrounding said first tube and forming with said first tube a waste gas passage for receiving waste gas from an enclosure and for discharging the waste gas from the recuperative burner; and
   (c) a third tube surrounding said second tube and forming with said second tube:
      (i) at least part of a combustion air passage for receiving combustion air for combustion of the fuel, whereby heat transfer can take place between the combustion air and the waste gas across the wall of said second tube, and
      (ii) a plurality of discrete chambers connecting said combustion air passage to said other end of said first tube to permit air to mix with the fuel either before or as the fuel discharges from said other end of said first tube, each one of said plurality of discrete chambers being wholly located within said waste gas passage and extending at least in part along the length of said waste gas passage so as to permit heat transfer to take place between the combustion air and the waste gas before the combustion air mixes with the fuel.

2. A burner as claimed in claim 1 in which each one of said plurality of discrete chambers extends along a major part of the length of said waste gas passage.

3. A burner as claimed in claim 1 in which the inlet and outlet in each one of said plurality of discrete chambers are so located that the combustion air is caused to flow through the chamber in a direction opposite to the direction in which the waste gas flows along said waste gas passage.

4. A burner as claimed in claim 1 wherein:
   (a) said combustion air passage comprises an innermost part formed by said second and third tubes and an outermost part formed by said third tube and a fourth tube which surrounds said third tube;
   (b) said innermost and outermost parts of said combustion air passage communicate with each other at one end of said combustion air passage; and
   (c) said fourth tube includes an inlet for the combustion air.

5. A burner as claimed in claim 2 or claim 4 in which each one of said plurality of discrete chambers incorporates means for causing the combustion air to flow through the chamber in a turbulent manner.

6. A burner as claimed in claim 1 in which each one of said plurality of discrete chambers extends radially of said first tube.

7. A burner as claimed in claim 1 wherein:
   (a) each one of said plurality of discrete chambers is defined at least in part between pairs of spaced walls and
   (b) each wall in each one of said pairs of spaced walls has one edge adjoining said first tube.

8. A burner as claimed in claim 7 wherein:
   (a) there is a space between two of said plurality of discrete chambers and
   (b) said burner further comprises means in said space for forcing waste gas to flow against the adjacent walls of said two of said plurality of discrete chambers.

* * * * *